US007748681B2

(12) United States Patent
Dent

(10) Patent No.: US 7,748,681 B2
(45) Date of Patent: Jul. 6, 2010

(54) SUPPORT POST ASSEMBLY WITH HINGE PLATE AND MOUNTING BRACKET ASSEMBLY

(76) Inventor: Clifford Dent, P.O. Box 6007, Farmington, NM (US) 87499

( * ) Notice: Subject to any disclaimer, the term of this patent is extended or adjusted under 35 U.S.C. 154(b) by 0 days.

(21) Appl. No.: 11/678,305

(22) Filed: Feb. 23, 2007

(65) Prior Publication Data
US 2007/0196164 A1 Aug. 23, 2007

Related U.S. Application Data

(60) Provisional application No. 60/775,871, filed on Feb. 23, 2006.

(51) Int. Cl.
F16M 13/00 (2006.01)
(52) U.S. Cl. .................. 248/548; 248/909; 256/13.1
(58) Field of Classification Search .................. 403/2; 256/13.1, 1; 52/98, 99; 248/548, 909
See application file for complete search history.

(56) References Cited

U.S. PATENT DOCUMENTS

| 375,412 | A | * | 12/1887 | Creque | ................. 248/159 |
| 3,820,906 | A | * | 6/1974 | Katt | ................. 403/2 |
| 3,846,030 | A | * | 11/1974 | Katt | ................. 403/2 |
| 4,071,970 | A | * | 2/1978 | Strizki | ................. 40/607.05 |
| 4,923,319 | A | | 5/1990 | Dent | ................. 403/2 |
| 5,480,121 | A | * | 1/1996 | Rice et al. | ................. 248/548 |
| 6,113,055 | A | * | 9/2000 | Salman | ................. 248/548 |
| 6,210,066 | B1 | | 4/2001 | Dent | ................. 403/2 |
| 6,409,156 | B2 | * | 6/2002 | Dent | ................. 256/13.1 |

* cited by examiner

Primary Examiner—Korie Chan
(74) Attorney, Agent, or Firm—Seed IP Law Group PLLC

(57) ABSTRACT

A support post assembly with mounting bracket assembly and hinge plate with defined bend lines and break points are provided to prevent or reduce damage to objects attached to the support post assembly. The hinge plate has an enhanced section having a channel formed transversely thereacross to function as a bend line when the support post assembly is subjected to a predetermined force. A section of reduced or removed material further directs the force to the weakened area to guide the bending, and openings in the bend line guide breaking or tearing of the plate. Damage is limited to the hinge plate, which is easily replaced. A mounting bracket assembly having a two-piece body for connecting or splicing support posts together includes a strap with crosspiece configured to provide a desired bend line or breakpoint.

12 Claims, 11 Drawing Sheets

SUPPORT POST ASSEMBLY WITH HINGE PLATE AND MOUNTING BRACKET ASSEMBLY

BACKGROUND OF THE INVENTION

1. Field of the Invention

The present invention pertains to support post assemblies and, more particularly, to connector brackets and hinge plate assemblies for attaching support posts to signs, luminaires, and the like.

2. Description of the Related Art

Typical support post installations involve securing one end of the post in the ground and attaching a sign, light fixture, or other object of interest to the other end. In certain installations, a plurality of posts are used to support each end of a large object or objects that span a distance, such as over a road.

In order to support the weight of large objects and to withstand the forces of nature, such as the wind, as well as impact from vehicles and other objects, the posts are sunk deep in the earth. When required, the posts are anchored in place with concrete or other anchoring methods. The disadvantage of such installations is that damage to a post requires replacement of the post and the anchoring system. For example, a vehicle impacting a post that supports a sign spanning a highway will cause damage to the impacted post, typically near the ground, necessitating excavation and replacement of the entire post and the anchoring system. In addition, the sign attached to the other end of the impacted post may remain suspended because it is supported by the other posts but become damage itself due to twisting and bending of the impacted post. This may also result in damage to the non-impacted posts.

In order to avoid replacement of the entire post and related anchoring system, a mounting bracket with breakaway connectors has been developed by the applicant, as disclosed in U.S. Pat. No. 4,923,319, entitled "Breakaway Connector" and U.S. Pat. No. 6,210,066, entitled "Breakaway Bracket Assembly," both of which are incorporated herein by reference in their entirety. Briefly, the mounting bracket and breakaway connectors have preformed stress points that will fracture when subjected to a predetermined load. The bracket and connectors will separate from the anchoring system without damaging it. Replacement of the post becomes a matter of replacing the remaining bracket or connector fragment at the anchor point with a new component and re-attaching the repaired post or a replacement post.

While the foregoing is sufficient for its intended purpose, it does not address damage occurring at the other end of the impacted post. In most situations a post that is broken or deformed at impact will damage the sign attached to it and possibly other supporting posts. Hence, there is a need for an attachment assembly that prevents or reduces damage to the attached sign or other supported object and facilitates replacement of the impacted post.

BRIEF SUMMARY OF THE INVENTION

The present disclosure is directed to a support post assembly and to a hinge plate and a mounting bracket assembly used in conjunction with support posts. In accordance with one embodiment of the disclosure, a mounting bracket assembly is provided for holding a first post member to a second post member, the assembly includes a first bracket member having a plurality of openings to enable connection of the first bracket member to the first and second post members, and a second bracket member coupled to the first bracket member in a location that will be between the first and second post members. The second bracket member has a channel formed therein to define a first half portion and a second half portion, and to define a hinge point in the second bracket member about which the first half portion will bend with respect to the second half portion when subjected to a predetermined force. In this manner the first post member will remain attached to the second post member but be permitted to swing about the bend line, thus preventing damage to the second post member and facilitating replacement thereof. Ideally, the second bracket member forms shoulders that are adapted to provide a surface against which the first and second post members rest or bear against.

In accordance with another embodiment, a mounting bracket assembly is provided for holding a first post member to a second post member that includes a first bracket member having a plurality of openings to enable connection of the first bracket member to the first and second post members. A second bracket member is provided that is coupled to the first bracket member in a location between the first and second post members. A plurality of openings are formed transversely through the second bracket member that define a first half portion and a second half portion in the second bracket member, and further define a breakpoint about which the first half portion will break with respect to the second half portion when subjected to a predetermined force. In this manner, the second post member will be permitted to break free from the first post member, preventing damage to the first post member and enhancing replacement of the second post member. Ideally, the second bracket member is configured to provide shoulders that are adapted to have surfaces against which the first and second post members rest or bear against.

In accordance with yet a further embodiment of the disclosure, a hinge plate for holding a first post member to a second post member in fixed space relationship is provided. The hinge plate is formed to have a body configured to be attached to the first and second post members. The body includes an enhanced section having shoulders and a channel formed between the shoulders that divides the body into a first portion and a second portion and that defines a bend line about which the first portion will bend with respect to the second portion when subjected to a predetermined force. Ideally, the enhanced section has a thickness that is greater than the non-enhanced remaining sections of the body.

In accordance with another embodiment, the hinge plate described above is provided with an enhanced section that, instead of having a channel, includes a plurality of openings formed transversely thereacross that divide the body into a first portion and a second portion and define a break line about which the first portion will bend or break or both with respect to the second portion when subjected to a predetermined force.

In accordance with another aspect of the foregoing embodiments of the disclosure, the hinge plate described above is provided that includes a combination of the channel and the plurality of openings formed across the enhanced section, the plurality of openings intersecting with the channel.

In accordance with yet another embodiment of the disclosure, a post system is provided that includes a first post adapted to be connected to an object; a second post member adapted to be anchored to the ground; and a mounting bracket assembly for holding the first post member to the second post member. In one embodiment, the mounting bracket assembly comprises first and second bracket members, the first bracket member having a plurality of openings to enable connection of the first bracket member to the first and second post members, and the second bracket member coupled to the first bracket member in a location between the first and second post members and having a channel formed therein to define a hinge point about which the first and second post members will swing when either of the first and second post members are subjected to a predetermined force. Ideally, the second bracket member is configured to have shoulders that are adapted to provide a surface against which the first and second post members will bear.

In accordance with another aspect of the foregoing embodiment, the post support system utilizes a unitary hinge plate instead of the mounting bracket assembly, the unitary hinge plate configured to be attached to the first and second post members and includes an enhanced section having shoulders and a channel formed between the shoulders to define a bend line about which the first and second post members will bend when either or both are subjected to a predetermined force.

In accordance with still yet another embodiment of the disclosure, a connector for attaching a first post section to a second post section to form a unitary support post for road signs, lights, and the like, is provided. The connector includes a plate having a first plate section sized and shaped to be attached to the first post section, a second plate section sized and shaped to be attached to the second post section, and a channel formed entirely across at least one side of the plate to divide the first plate section from the second plate section and to provide a weakened portion of the plate to enable bending and tearing of the plate when the unitary post is subjected to a force from any direction.

In accordance with another aspect of the foregoing embodiment, the channel includes at least one opening formed therein through the plate to further direct the force for bending and tearing of the plate.

In accordance with yet another aspect of the foregoing embodiment, the channel includes two or more parallel grooves formed in the plate. In one embodiment, the channel is formed on both sides of the plate in back-to-back relationship. In another aspect of the foregoing embodiment, the channel is formed of two parallel adjacent grooves on at least one side and preferably on both sides of the plate.

In accordance with yet a further embodiment, the foregoing plate also includes at least one, and preferably two, sections that are cut out adjacent to the channel formed in the fuse plate. Ideally, the cutout sections are in the shape of a V wherein the point or apex of the V terminates in the channel and the width of the cutout increases to the side of the plate.

BRIEF DESCRIPTION OF THE SEVERAL VIEWS OF THE DRAWINGS

The foregoing and other aspects of the invention will be more readily appreciated as the same become better understood from the following detailed description when taken in conjunction with the accompanying drawings, wherein.

DETAILED DESCRIPTION OF THE INVENTION

Representative embodiments of the present disclosure will now be described in conjunction with FIGS. 1-9. It is to be understood that while these embodiments are described in conjunction with a support post system for supporting road signs, it is to be understood that the present invention will have application with respect to luminaires, and to other objects supported above the ground where either or both of the support posts and the supported object are subjected to a predetermined load, such as from impact or from the wind.

Figure 1:
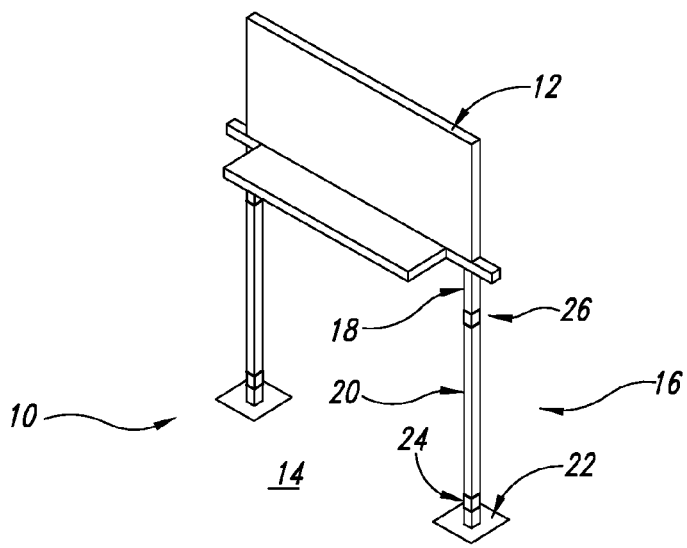
FIG. 1 is an isometric projection of a signpost assembly formed in accordance with the present invention.

Referring initially to FIG. 1, shown therein is a support post system 10 that includes a sign 12 supported about the ground 14 by a support post assembly 16. In this embodiment, the support post assembly 16 includes a first post member 18 attached to the sign 12, and a second post member 20 attached to an anchor assembly 22 by a breakaway connector system 24. It is to be understood that the breakaway connector system 24 can be formed of existing systems or the embodiments disclosed herein can be used where applicable.

The second post member 20 is attached to the first post member 18 by a joint splice 26 formed in accordance with the embodiments described in more detail below.

Figure 2:
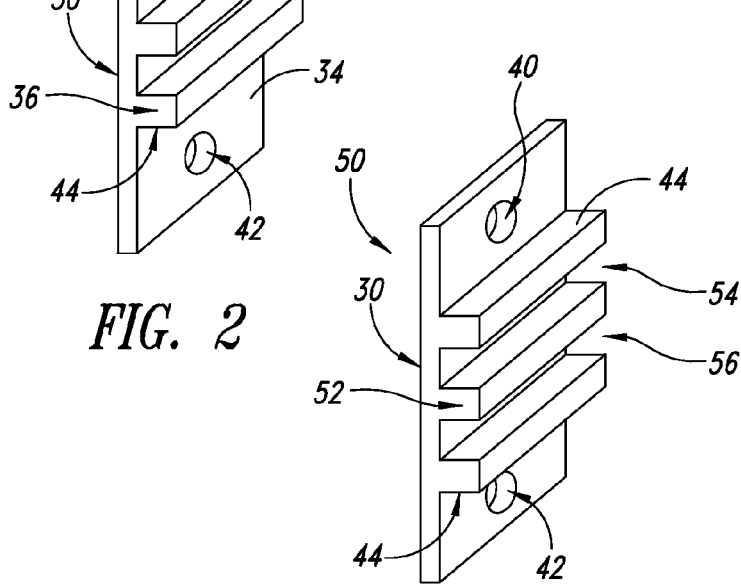
FIG. 2 is an isometric projection of a unitary hinge plate formed in accordance with one embodiment of the present invention.

Turning next to FIG. 2, shown therein is a hinge plate 28 formed in accordance with one embodiment of the disclosure. The hinge plate 28 in this embodiment comprises a unitary body 30 having a first substantially planar mounting portion 32 and a second substantially planar mounting portion 34 depending from an enhanced section 36 that forms the central portion of the body 30. The enhanced section 36 has a thickness that is greater than the thickness of the unenhanced portions of the body 30, i.e., the first and second mounting portions 32, 34. A channel 38 is formed in the enhanced section 36 that in this embodiment extends transversely across the entire width of the body 30.

In one embodiment, the channel 38 has a substantially curved or arcuate cross-sectional configuration to facilitate bending without breaking. The channel 38 divides the body 30 into first and second halves and constitutes a weakened area that functions as a bend line. When one or the other or both of the first and second mounting portions 32, 34 are subjected to a predetermined force normal to a face of the mounting portions 32, 34, the body 30 will bend about the channel 38. This predetermined force can be a compound of a larger total force acting from a different direction. The enhanced section 36 projects from one side of the body 30 to form two shoulders 44. Openings 40, 42 in the first and second mounting portions 32, 34, respectively, provide access for fasteners (shown in FIG. 3). Ideally, they channel is adapted to permit bending while resisting breaking, thus retaining the attached post members in a connected relationship.

Figure 3:
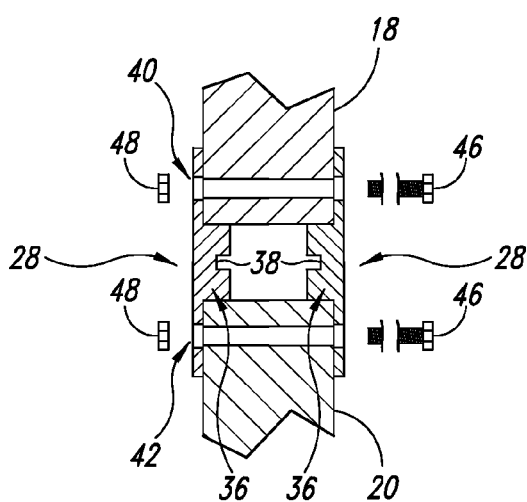
FIG. 3 is a cross-sectional view of the unitary hinge plate of FIG. 1 installed on a square tube post assembly.

As shown in FIG. 3, a pair of hinge plates 28 are used to hold the first post member 18 and second post member 20 in fixed spaced relationship. Each hinge plate 28 has the enhanced section 36 positioned so that the first and second first post members 18, 20 bear against the respective shoulders 44. A pair of fasteners 46 pass through the first and second first post members 18, 20 and the openings 40, 42 in the hinge plates 28, which are then secured in place by nuts 48.

When one or the other or both of the first and second first post members 18, 20 are subjected to a force that is less than the maximum sustainable load of the first and second post members 18, 20, the hinge plates 28 will bend about their respective channel 38, allowing the second post member 20 to move or swing with respect to the first post member 18. Similarly, should the sign 20 be subjected to a wind force that is greater than the predetermined load of the hinge plate 28, the first post member 18 will bend with respect to the second post member 20 about the channel 38 in the respective hinge plates 28.

Figure 4:
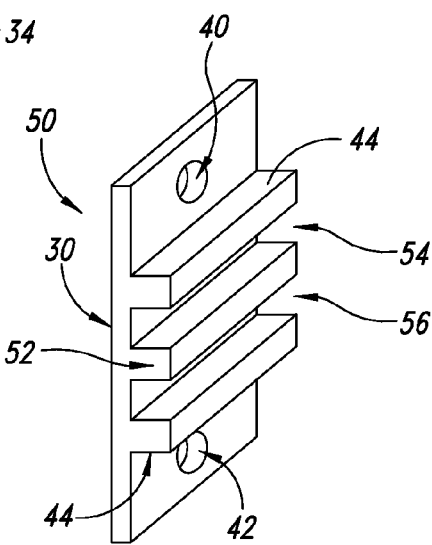
FIG. 4 is an isometric projection of another embodiment of the unitary hinge plate formed in accordance with the present invention.

Turning next to FIG. 4, shown therein is an alternative embodiment of a hinge plate 50 formed in accordance with the present disclosure. For ease of reference, elements in common with the hinge plate 50 and the hinge plate 28 will have the same reference numbers. In this embodiment, the enhanced section 52 has two channels 54, 56 formed therethrough. The additional channel provides additional flexibility to the hinge plate 50 and enables it to swing more readily, i.e., at a lower amount of force.

Figure 5:
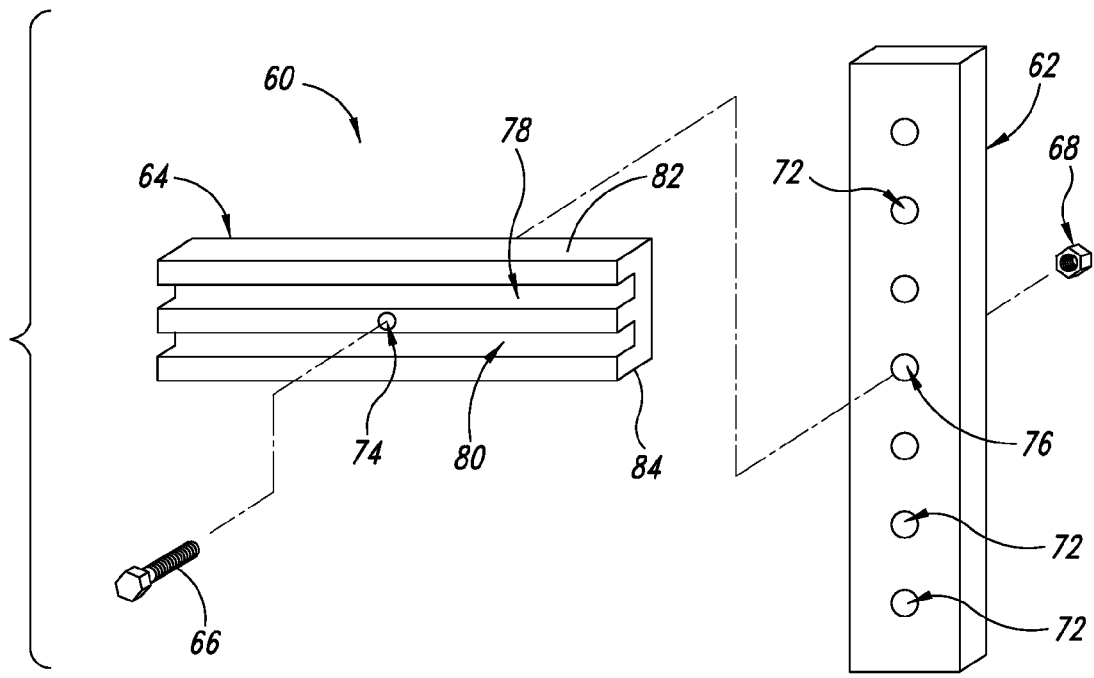
FIG. 5 is an exploded isometric projection of a two-piece hinge plate assembly formed in accordance with the present invention.

Turning next to FIG. 5, shown in an exploded view is a mounting bracket assembly 60 that includes a strap 62 and crosspiece 64 that attaches to the strap 62 with a fastener 66 and nut 68. The strap 62 includes an elongate body 70 having a plurality of openings 72 formed therein and aligned along the longitudinal axis of the body 70 for attaching the body 70 to support posts (not shown). The fastener 66 passes through a central opening 74 in the crosspiece 64 and an opening 76 in the strap 62 to connect with the nut 68.

The crosspiece 64 includes two channels 78, 80 formed across its width. The crosspiece 64 has a top surface 82 and bottom surface 84 that function as shoulders when attached to the strap 62. The shoulders 82, 84 provide a surface against which post members will bear. The opening 74 is formed in the ridge between the channels 78, 80 so as not to interfere with bending of the cross piece 64.

This mounting bracket assembly 60 is configured to attached to first and second post members 18, 20, in the same manner as the hinge plate 28 shown in FIG. 3. The fasteners 46 pass through the openings 72 of the strap 62 to hold the first and second post members in fixed spaced relationship. However, in this embodiment the strap 62 may be used alone or in combination with the crosspiece 64. In one manner of use, the crosspiece 64 is preinstalled on the strap 62 before attachment to the post members 18, 20. Alternatively, the crosspiece 64 can be inserted between the first and second post members 18, 20 after the strap 62 has been attached. The two channels 78, 80 function in the same manner as described above with respect to the channels 54, 56 of the hinge plate 50 of FIG. 4.

Figure 6:
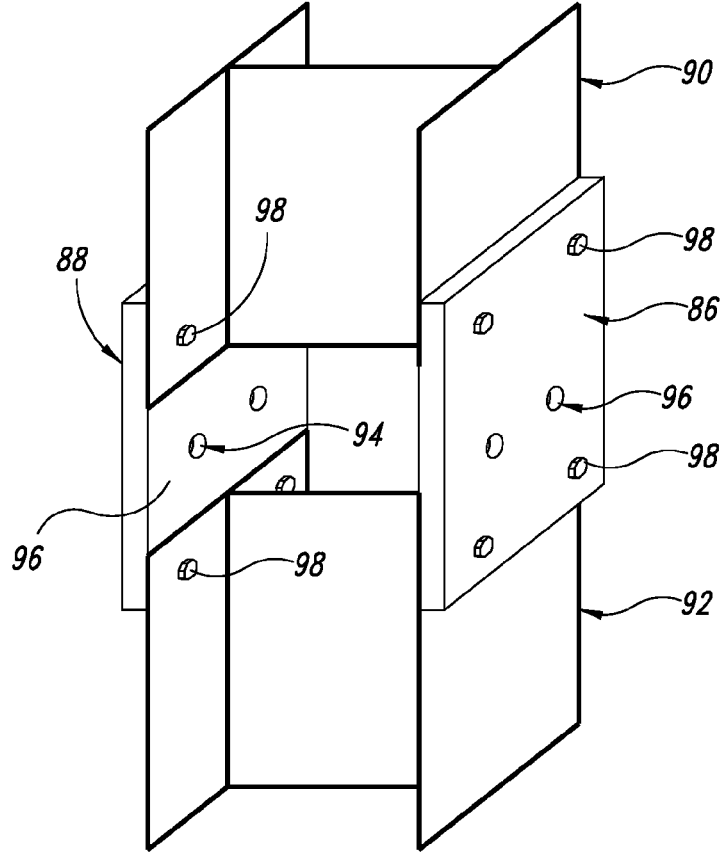
FIG. 6 is an isometric projection of a strap member of the two-piece hinge plate assembly formed in according with another embodiment of the invention as installed on an I-beam post.

Shown in FIG. 6 is another embodiment of the invention wherein a first strap 86 and another strap 88 are attached to either side of a first I-beam member 90 and a second I-beam member 92 to hold the first and second I-beam members 90, 92 in fixed spaced relationship. Fasteners 98 are provided to hold the straps 86, 88 to their respective I-beam members 90, 92. Here, the first and second straps 86, 88 each have a plurality of openings 94 formed transversely across a central portion 96 thereof. The openings 94 may vary in size and number; however, their center points are aligned along a desired bend line. The function of the openings 94 is to provide a weakened area about which the strap 86, 88 will bend when subjected to a predetermined force.

Figure 7:
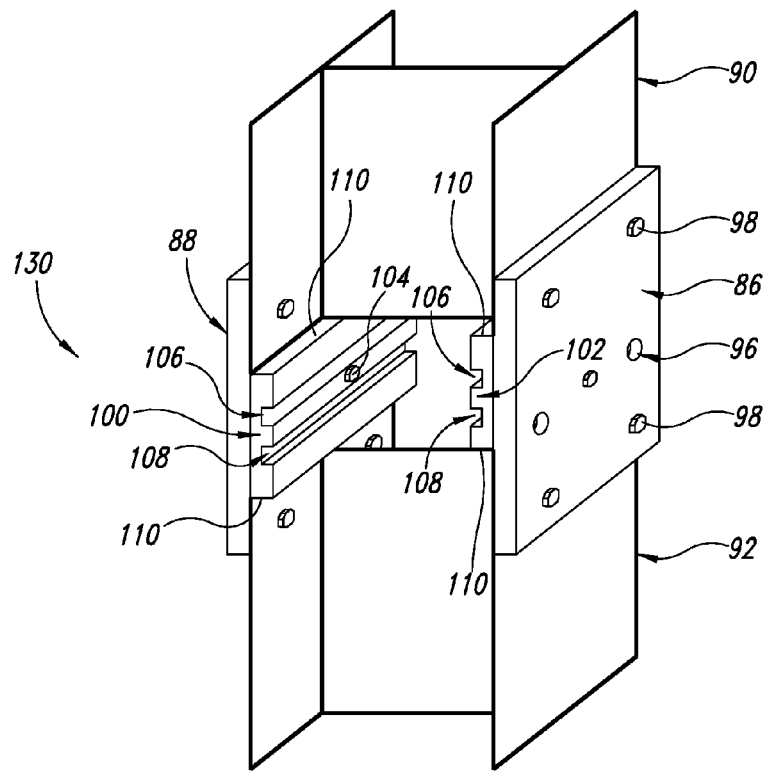
FIG. 7 is an isometric projection of the strap member of FIG. 6 and a crosspiece of the hinge plate assembly of FIG. 5 installed on the I-beam post of FIG. 6 in accordance with the present invention.

Shown in FIG. 7 is yet another alternative embodiment of the support post assembly of FIG. 6 wherein crosspieces 100, 102 have been inserted between the first and second I-beam members 90, 92 and bolted to the respective straps 86, 88 by fasteners 104. Each crosspiece 100, 102 includes a plurality of channels 106, 108 formed in the manner as described above with respect to the crosspiece 64 in FIG. 5. The I-beams 90, 92 bear against the shoulders 110 of the respective crosspieces 100, 102. In this embodiment, the channels 106, 108 cooperate with the openings 94 in the straps 86, 88 to ensure bending and breaking occurs at the desired location, i.e., along the channels 106, 108.

Figure 8:
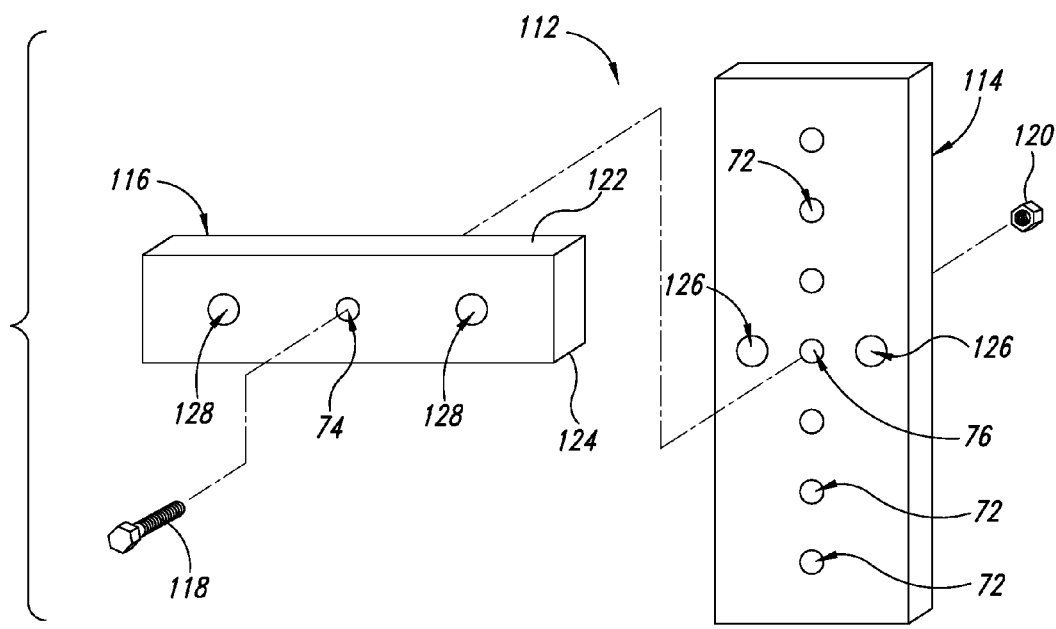
FIG. 8 is an exploded isometric projection of a two-piece mounting bracket assembly formed in accordance with the present invention.

In FIG. 8, yet a further embodiment of the invention is illustrated wherein a mounting bracket assembly 112 is provided to include a strap 114 and crosspiece 116 configured to be bolted to the strap 114 by fastener 118 and nut 120. As with previous embodiments, the crosspiece 116 has shoulders 122, 124 formed on the respect top and bottom sides thereof. The fastener 118 passes through a central opening 74 in the crosspiece 116 and an opening 76 in the strap 114 to connect with the nut 120. A plurality of openings 72 are provided in the strap 114 for connection to appropriate post members (not shown).

In this embodiment, a plurality of openings 126 are formed transversely across the strap 114, preferably in alignment with the opening 76 to define a linear breakpoint or bend line for the strap 114. Openings 128 are formed across the width of the strap 114 that provide a similar function as the openings 126 in the strap 114. This embodiment may be used in place of the mounting bracket assembly 130 shown in FIG. 7.

Figure 9:
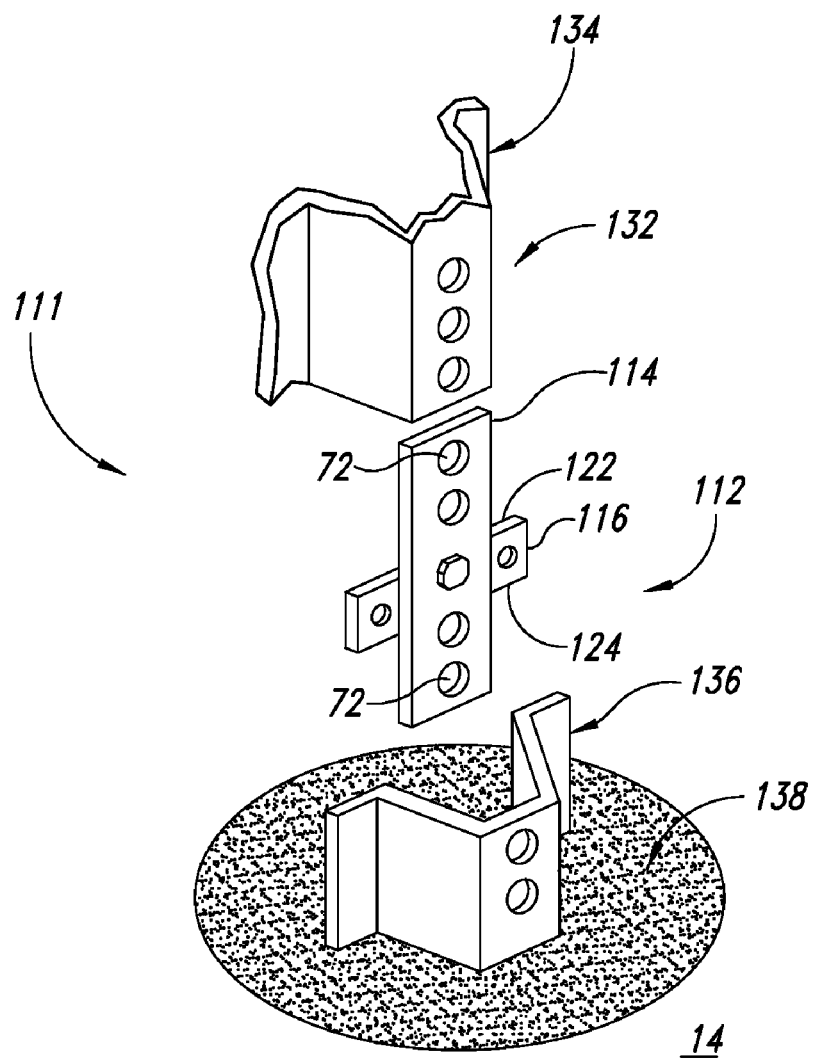
FIG. 9 is an exploded isometric projection of the mounting bracket assembly of FIG. 8 in conjunction with a U-channel post.

Turning next to FIG. 9, illustrated therein is a post support assembly 111 having the mounting bracket assembly 112 of FIG. 8 shown in exploded relationship with a U-channel post assembly 132 comprising a first post member 134 positioned above the mounting bracket assembly 130 and second post member 136 anchored in a concrete pad 138 formed in the ground. The first and second post members 134, 136 each include openings 140 for aligning with the openings 72 in the strap 114 for attachment. The first and second post members 134, 136 are positioned to bear against the crosspiece 116 on the shoulders 122, 124 thereof.

The mounting bracket assembly 112 may be positioned on the inside of the U-channel post members 134, 136 or on the outside. In either mounting position, the crosspiece 116 will be positioned between the first and second post members 134, 136.

Figure 10:
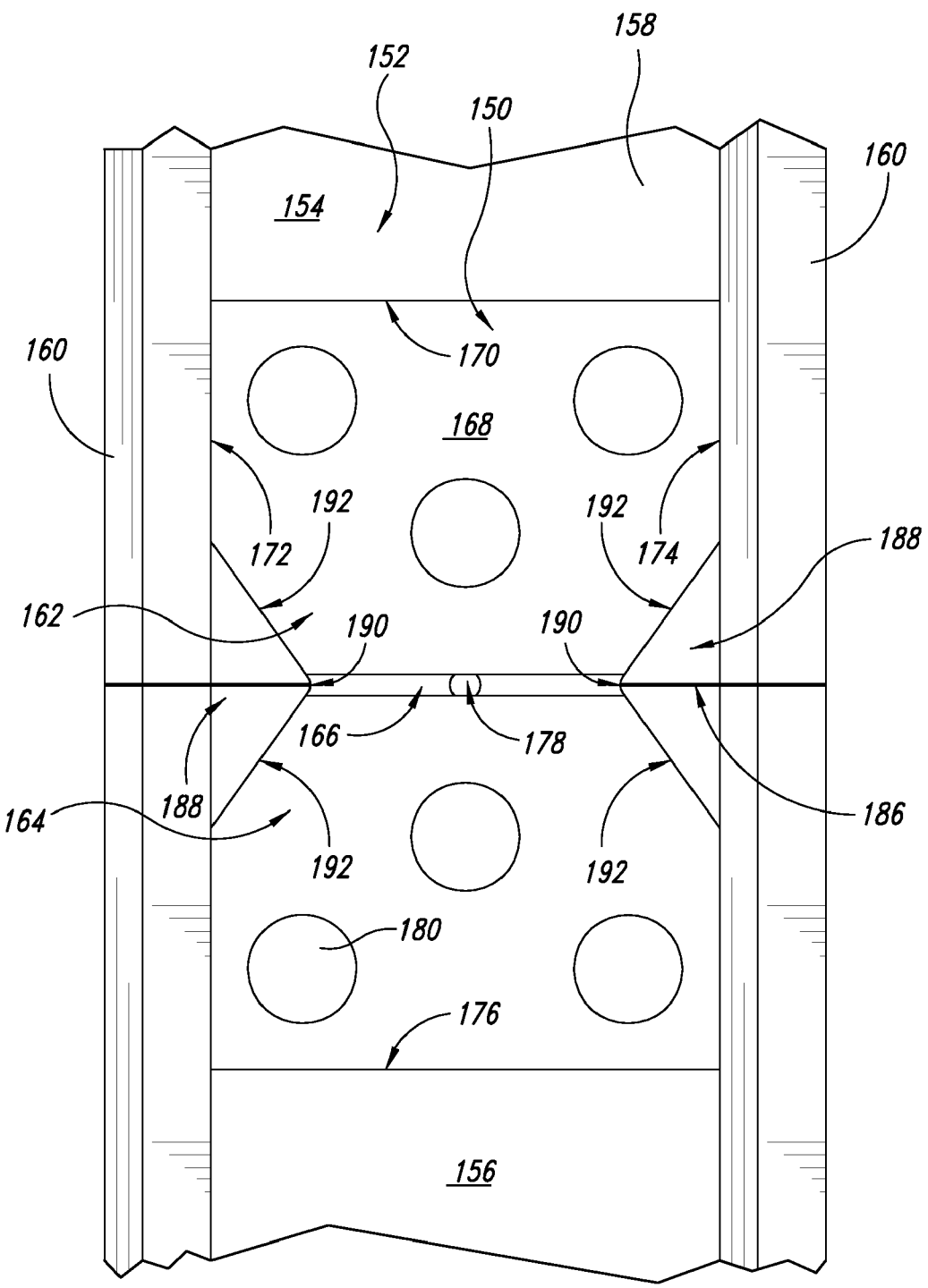
FIG. 10 is a plan view of a fuse plate formed in accordance with a further embodiment of the present invention.
Figure 11:
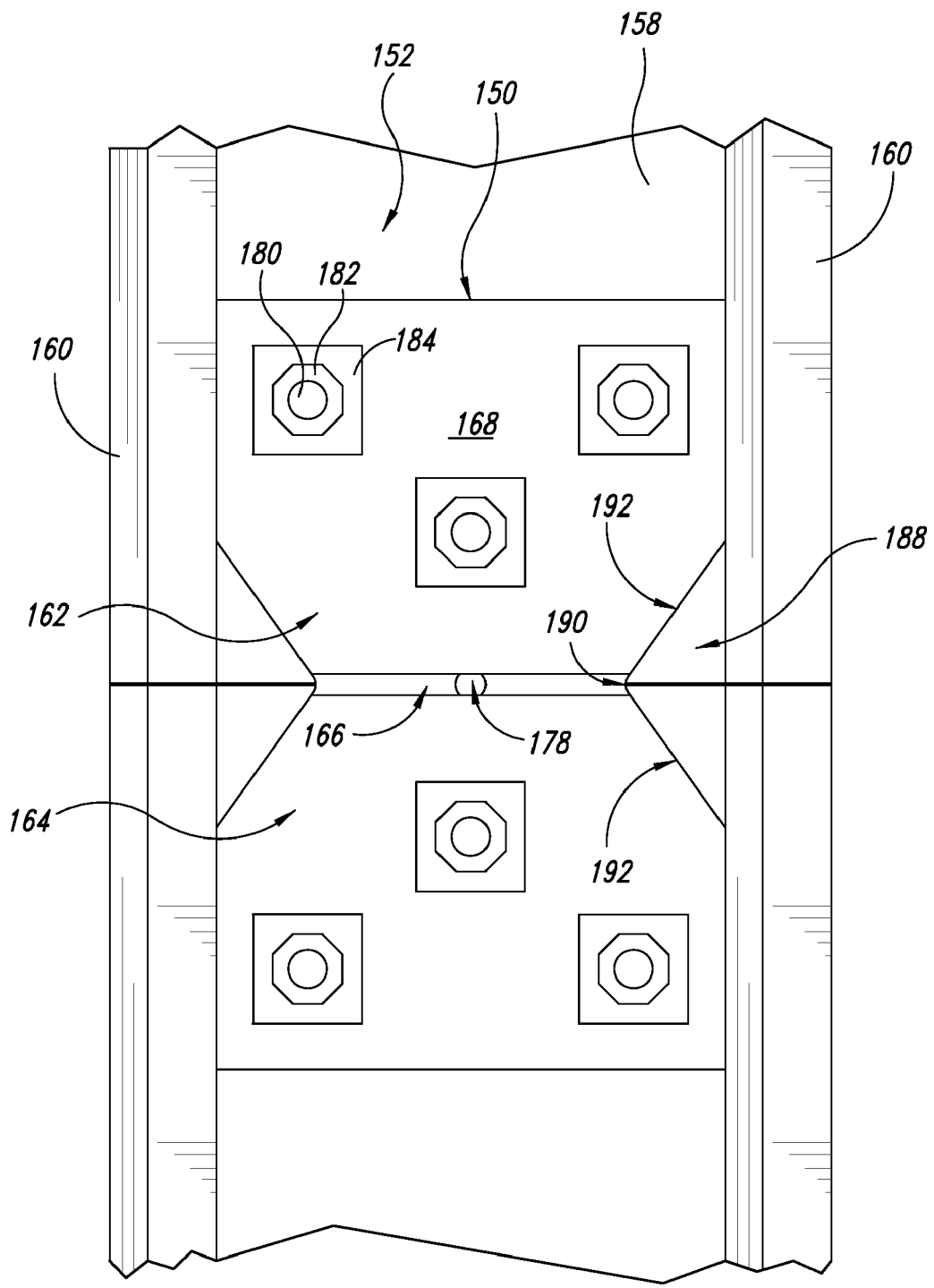
FIG. 11 is an isometric view of the fuse plate of FIG. 10 in conjunction with a support post.

Referring next to FIGS. 10 and 11, shown therein is another embodiment of the invention in the form of a breakaway fuse plate 150 attached to a support post 152. As shown in these figures, the support post 152 is formed of an upper post section 154 and a lower post section 156 that are held together by the fuse plate 150 to form a unitary support post 152. Ideally, a corresponding plate is used on a reverse side of the web 158. In this embodiment, the support post 152 is a typical I-beam or H-beam post having a web 158 with flanges 160 at each end of the web 158. It is to be understood, however, that the present embodiment can be adapted for use by sizing and shaping it for attachment to support posts of different configurations, including channel, angle, and rectangular or square solid post construction, of either metal, wood, or metal alloys of varying forms. In one embodiment, the metal is ASTM-36 steel or 65-45-12 ductile iron or 60-40-18 ductile iron.

The plate 150 as seen in these views is of substantially a rectangular shape and is divided into a first plate section 162 and second plate section 164 by a channel 166. In the embodiment shown, the plate 150 is substantially flat having mutually opposing parallel faces 168 that are circumscribed by a top edge 170, first and second side edges 172, 174, and a bottom edge 176.

The channel 166 extends from the first side edge 172 to the second side edge 174 to bisect the plate 150 and provide a weakened area about which the plate 150 can bend and break or tear when subjected to a predetermined force through the support post 152. The channel 166 can have different cross-sectional configurations, and as shown here it is arcuate or circular. However, it can have a rectangular or square or V-shaped configuration to meet particular applications. Although the plate 150 shown in FIGS. 10 and 11 has the channel 166 formed only in the exposed face 168, it is to be understood that the channel 166 can also be formed on the reverse side of the plate 150, either alone or in combination with a matching channel on the opposite face. It is to be also understood that while the channel 166 is shown as a single groove, it is possible to form the channel as multiple parallel grooves, such as two or three grooves, either formed on one side or both sides of the plate 150. When formed on both sides of the plate 150, the opposing grooves should be back-to-back to facilitate bending of the plate 150 only about the channel 166 or tearing of the plate along the channel 166.

To facilitate the tearing of the plate 150, an opening 178 is formed completely through the plate 150 and positioned within the channel 166. As shown in FIGS. 10 and 11, the opening 178 in the channel 166 is positioned at the center of the plate 150, both longitudinally and laterally. However, it is to be understood that one or more openings can be formed in the channel 166 and positioned at various points along the channel 166. Ideally, the diameter of the opening extends to the vertical top and bottom sides of the channel 166, and it can be laterally elongated as shown.

The plate 150 is preferably sized and shaped for attachment to the web 158 of each of the upper and lower post sections 154, 156. One manner of attachment is by use of fasteners extending through a plurality of openings (not shown) formed in the plate 150. As shown in FIGS. 10 and 11, the fasteners are in the form of a bolt 180 extending through a corresponding opening formed in the plate 150, through the web 158 of the support post 152, and ideally through a second plate 150, where a nut 182 as shown in FIG. 11 is used to tighten the bolt, the plates 150, and the two sections 154, 156 of the support post 152. An optional washer 184 can be used as shown in FIG. 11. Other methods of attachment can include welding, bonding with adhesive, riveting, and the like. In this embodiment, six bolts are used, three on each of the first and second plate sections 162, 164. When so attached to the support post 152, the channel 166 is aligned over the intersection 186 of the upper and lower post sections 154, 156. As shown in this embodiment, the post sections 154, 156 are placed together in abutting relationship where they are held by the plates 150. While two plates 150 are used, it is to be understood that only one plate 150 can be used in certain situations.

In accordance with another embodiment of the invention, and as an enhancement to all of the foregoing embodiments described in conjunction with FIGS. 2-11, the breakaway hinges and fuse plates can be further designed to bend and tear at their respective weakened areas by completely removing additional material adjacent to the weakened area. The removal of the material will facilitate directing of forces to the weakened area and guiding the bending, and tearing where required, of the material of the breakaway bracket or fuse plate.

For example, in FIGS. 10 and 11, a cutout section 188 is formed in each of the first and second side edges 172, 174. The cutout section 188 is formed by the removal of material from the plate 150 or by forming of the plate 150 such that the cutout section is generated. It is to be understood that the cutout section can be formed in only one of the side edges 172, 174, although preferably it is formed in both side edges 172, 174 to direct forces generated from any direction.

The cutout section as shown in the embodiment of FIGS. 10 and 11 has a triangular shape such that an apex 190 of the triangle intersects with the channel 166. The edges 192 of the cutout section 188 then extend away from the apex 190 such that the width of the cutout section 188 increases towards the edges 172, 174.

The design illustrated and described in conjunction with FIGS. 10 and 11 is configured to provide an omni-directional fuse plate that attaches to both the lower and upper sections of a support post for a sign structure, light pole, guardrail post, or any post system that will bend and tear when subjected to a force from any direction. Thus, the system described above will work on all types of posts. On sign structures, the intersection 186 of the upper and lower post sections 154, 156 will be approximately nine feet off the ground. With guardrails and posts, it will be approximately four inches off the ground.

To install the present invention on existing posts, it will be necessary to cut the post where the installation is desired to form the upper and lower post sections 154, 156. When the plate 150 is installed with bolts 180, there are no torque requirements in most applications. Thus, when subjected to an impact from any direction, the impact side of the omni-directional fuse plate system comes apart while the other side of the system holds the post, allowing the vehicle to pass under the sign structure. With guardrail posts or other systems that are required to break away close to the ground, the present invention allows the post to just lie down from the impact. This enables the vehicle to travel over the post. Hence, the invention provides a unique method and device that is mounted solely to the web of the post in one embodiment.

With respect to the fuse plate of FIGS. 10 and 11, it is to be understood that the plate is preferably formed of a unitary flat piece of metal material. In one embodiment, the plate has a preferred thickness range of one-fourth inch to one-half inch, depending on the size of post or beam to which it is attached. In addition, the single channel 166 has a preferred width of has a preferred depth in the range of one-sixteenth of an inch to three-eighths of an inch, depending on the beam size. When two grooves are formed to create the channel, each groove will have a preferred depth in a range of one-sixteenth of an inch to three-eighths of an inch.

In another embodiment, the plate 150 is formed such that the first plate section and second plate sections 162, 164 are in two pieces and are joined by a breakaway element that includes the channel 166 or grooves. The plate sections can be joined by welding, fasteners, or other means known to those skilled in the art so that the breakaway element is positioned at the desired breaking or tearing point.

Figure 12:
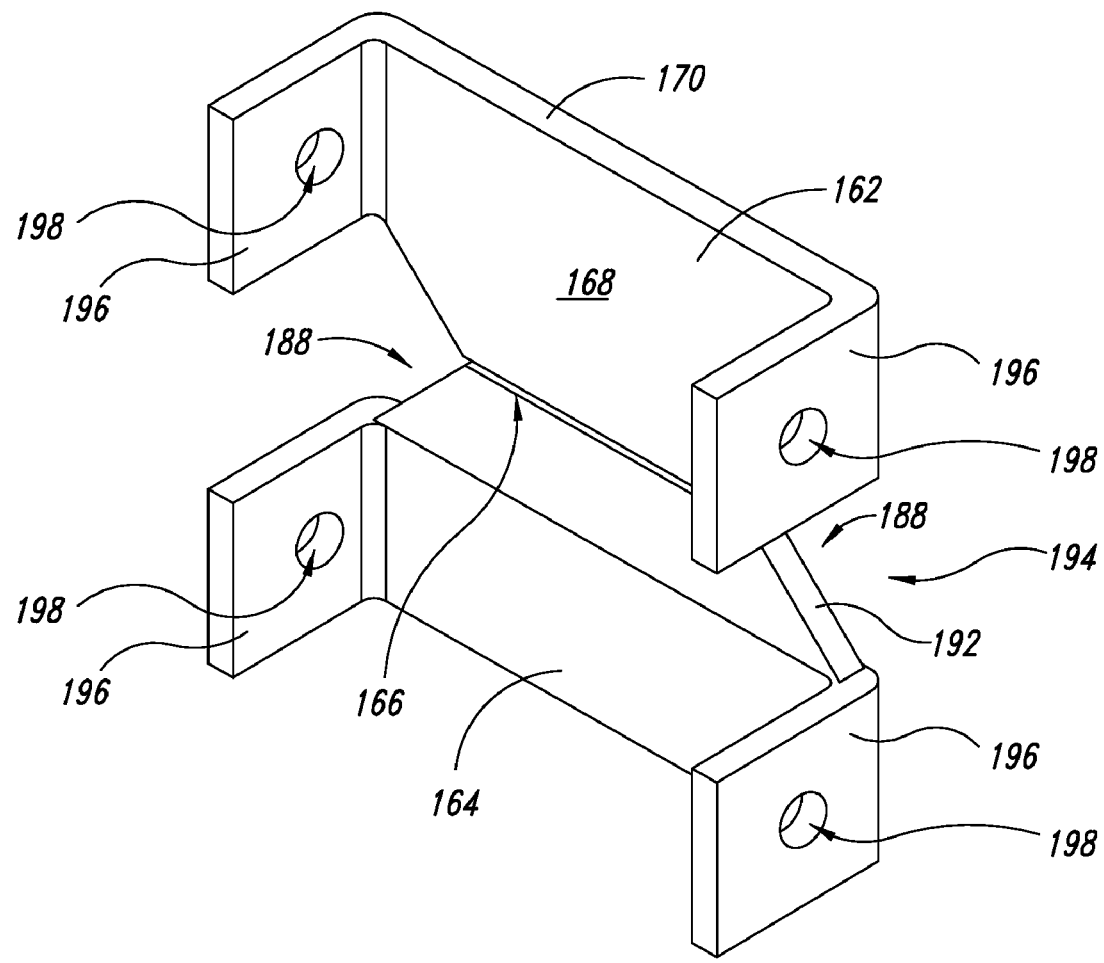
FIG. 12 is an isometric view of a fuse plate formed in accordance with yet a further embodiment of the invention.
Figure 13:
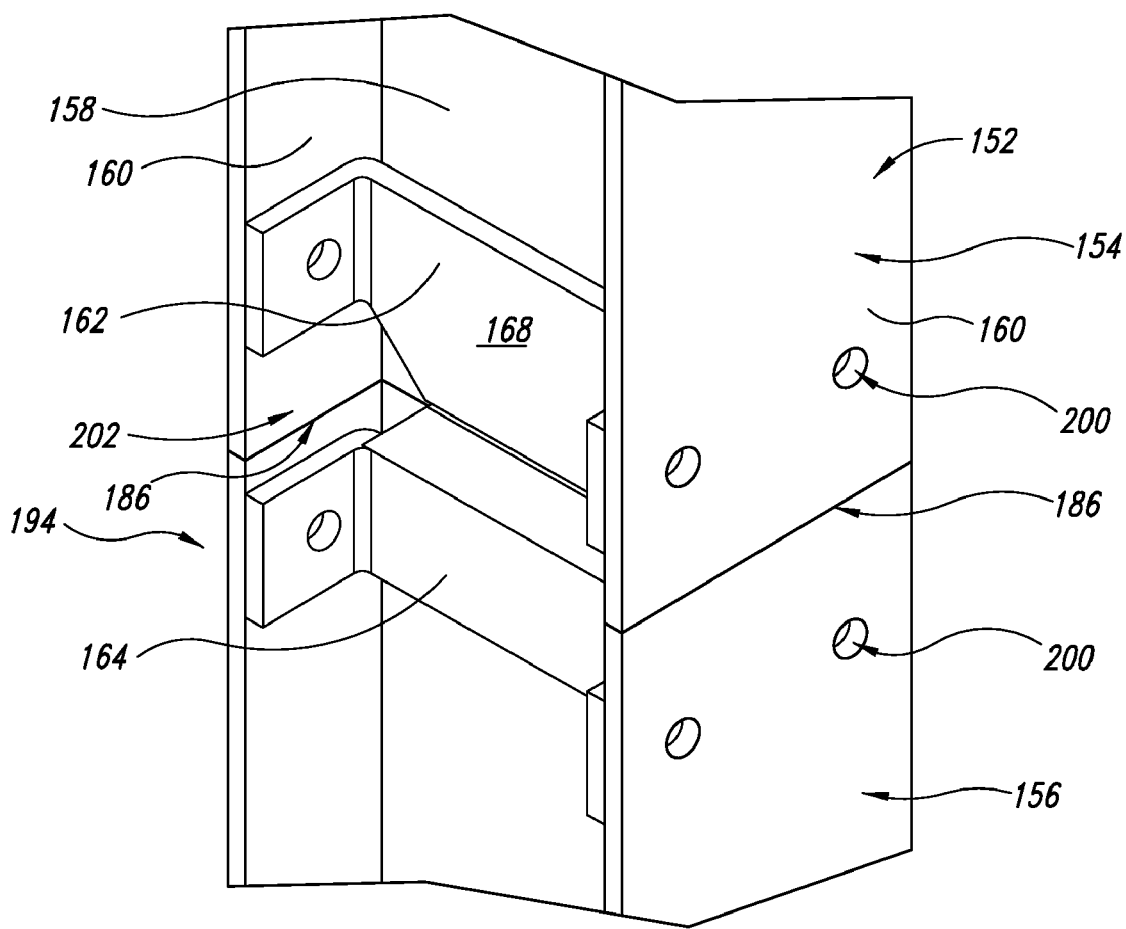
FIGS. 13 and 14 are isometric views of alternative applications of the fuse plate of FIG. 12.
Figure 14:
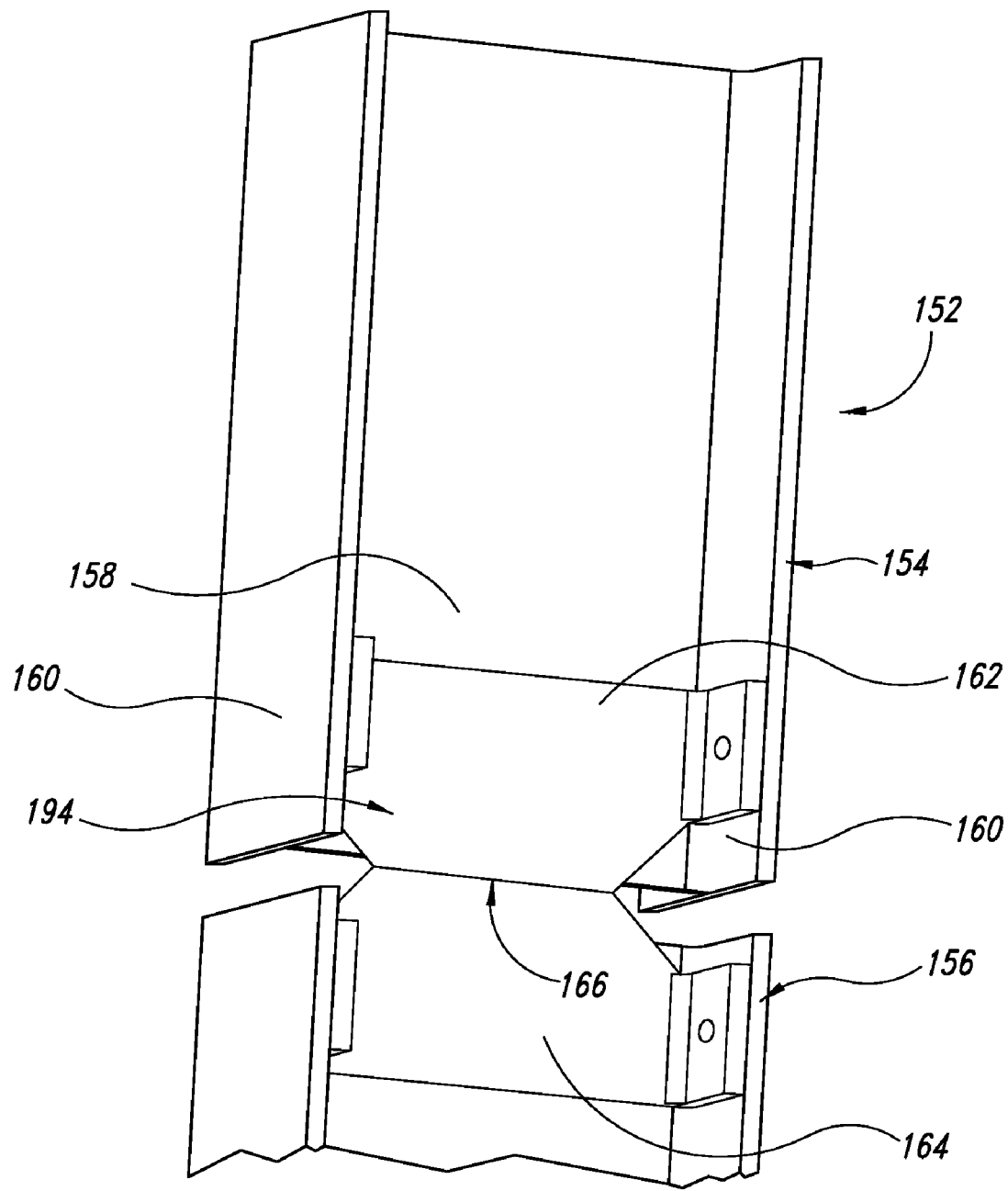

FIGS. 12-14 illustrate yet another embodiment of the invention in which a plate 194 is provided having a configuration similar to the plate 150 described above and further including extensions or wings 196 on one or more corners thereof. For ease of reference, like reference numbers will be used to refer to identical components or features of the plates 150 and 180.

In the embodiments shown in FIGS. 12-14, the fuse plate 194 includes a plurality of flanges or wings 196 extending from each of the first and second side edges 172, 174 on each of the first and second plate sections 162, 164 for a total of four wings 196. Each wing has a substantially square-shaped configuration and includes an opening 198 through which a fastener can pass. This particular configuration enables the plate 194 to be retrofit to existing applications where openings 198 can be used with existing fastener openings 200 in the flanges 160 of the support post 152 as shown in FIG. 13. It is to be noted in the embodiment of FIG. 13, the plate 194 utilizes substantially rectangular cutout sections 202 in association with the wings 196 instead of the V-shaped cutout section 188 shown in FIG. 12. As previously explained, the shape of the cutout section can be adapted for the particular application of the fuse plate system.

FIG. 14 shows the plate 194 used with the upper post section 154 spaced apart from the lower post section 156. This particular installation prevents the rubbing together and damaging of the post sections 154, 156 that can occur when the support post 152 is subjected to the elements, particularly to wind. This particular mounting configuration prevents rubbing off of the galvanization and the subsequent rusting of the area. Hence, the plate 194 is attached to the web and to the flanges of the post 152, whereas in the past other devices have been attached to only the flanges of the post.

Figure 15:
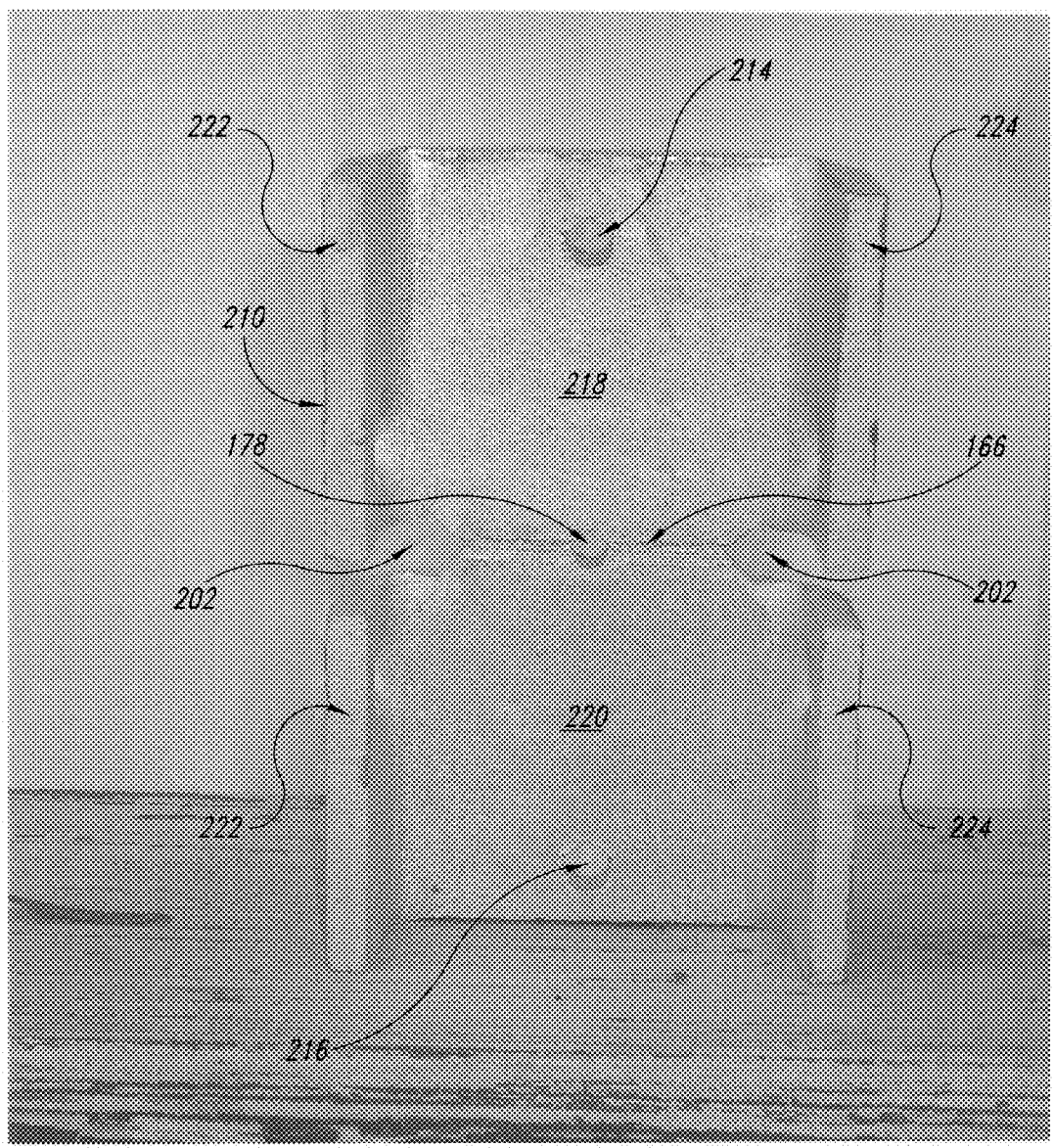
FIG. 15 is an isometric view of another alternative embodiment of the invention.
Figure 16:
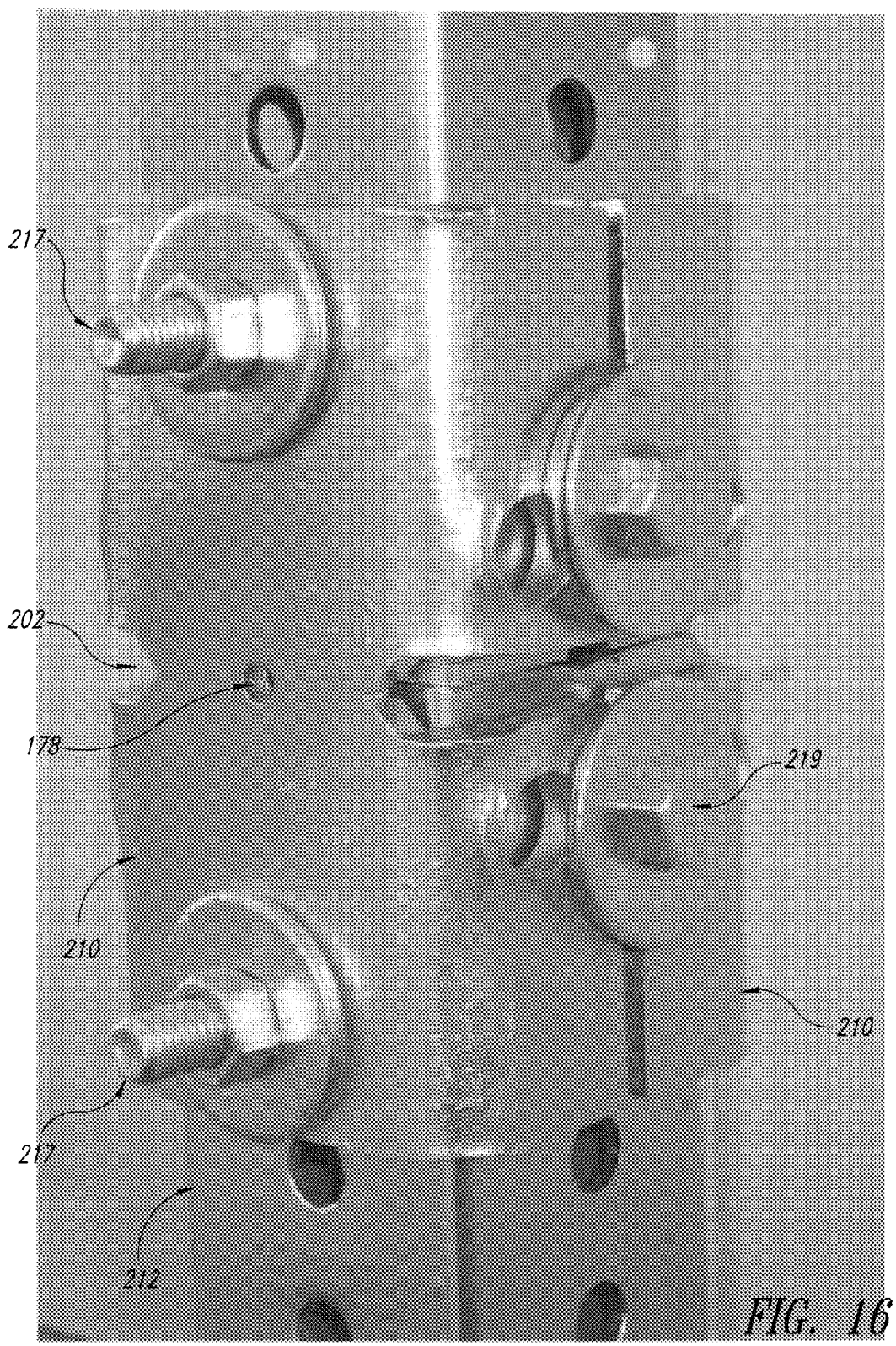
FIG. 16 is an isometric view of the embodiment of FIG. 15 employed on the exterior of a post.

FIGS. 15 and 16 illustrate yet another embodiment of the invention in which a fuse plate 210 is applied to the exterior of a square tube post 212. Here, the fuse plate 210 has two additional openings 214, 216 to accommodate fasteners 217 through the first and second plate sections 218, 220. In addition, the wings 222, 224 extending from each side of the first and second plate sections 218, 220 are formed to accommodate a fastener 219 between them, as shown in FIG. 16, or cutout sections 188, 202 disclosed above can provide clearance for the fastener.

The web design disclosed herein increases wind load capacity while bending, breaking, and releasing easier when impacted. On a 53×5.7 I-beam, the fuse plate of the present disclosure breaks 69% easier than existing connector plates, yet withstands greater wind loads.

Although a preferred embodiment of the invention has been illustrated and described, it is to be understood that various changes may be made therein without departing from the spirit and scope of the invention. Hence, the invention is to be limited only by the scope of the claims that follow and the equivalents thereof.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The embodiments of the invention in which an exclusive property or privilege is claimed are defined as follows:

1. A mounting bracket assembly for holding a first post member to a second post member, each post member having at least a back wall and first and second side walls, comprising
 a first flat bracket member having an opening to enable connection of the first bracket member to the back wall of the first post member;
 a second flat bracket member having an opening to enable connection of the second bracket member to the back wall of the second post member; and
 a wing extending from each side of the first and second bracket members for attachment to one of the first and second side walls of the first and second post members, each wing formed of a single planar segment that extends from the respective first and second bracket members and terminates at an outside edge;
 a planar channel section having a first half portion integrally formed with the first bracket member and a second half portion integrally formed with the second bracket member, and a channel formed across a face of the planar channel section, the planar channel section further including at least one V-shaped cutout section formed completely through at least the planar channel section and the first and second bracket members, the at least one cutout section extending from an edge of the first and second bracket members and extending into the channel section to converge at the channel, and configured to form a linear hinge point about which the first half portion will bend with respect to the second half portion when subjected to a predetermined force from any direction.

2. The assembly of claim 1 wherein the channel has an arcuate cross-sectional configuration.

3. The assembly of claim 1 wherein the channel has at least one opening formed therethrough.

4. The bracket assembly of claim 1 wherein the second bracket member is integrally formed with the first bracket member.

5. A post support system for supporting an object, comprising:
 a first post member adapted to be attached to the object;
 a second post member adapted to be anchored to the ground; and
 a mounting bracket assembly for holding the first post member to the second post member, comprising:
  a first flat bracket member having an opening to enable connection of the first bracket member to the back wall of the first post member;
  a second flat bracket member having an opening to enable connection of the second bracket member to the back wall of the second post member; and
  a wing extending from each side of the first and second bracket members for attachment to one of the first and second side walls of the first and second post members, each wing formed of a single planar segment that extends from the respective first and second bracket members and terminates at an outside edge;
  a planar channel section having a first half portion integrally formed with the first bracket member and a second half portion integrally formed with the second bracket member, and a channel formed across the channel section, the channel section further including at least one V-shaped cutout section formed completely through at least the channel section and the first and second bracket members, the at least one cutout section extending from an edge of the first and second bracket members and extending into the channel section to converge at the channel, and configured to form a linear hinge point about which the first half portion will bend with respect to the second half portion when subjected to a predetermined force from any direction.

6. A system for supporting signs above the ground, comprising:

a first post member adapted to be attached to the sign, the first post member having a central web member that has at least two side walls extending therefrom to form at least one U-shaped channel;

a second post member adapted to be anchored to the ground, the second post member having a central web member that has at least two side walls extending therefrom to form at least one U-shaped channel; and a planar hinge plate comprising a first mounting portion attached to the first post member, a second mounting portion attached to the second post member, and an enhanced section integrally formed with the first and second mounting portions, the enhanced section comprising a planar reduced thickness portion formed transversely across the enhanced section, and including a V-shaped cutout section formed completely through the hinge plate on first and second sides of the enhanced section, each cutout section converging from the respective side of the enhanced section into a groove in the planar reduced thickness portion that divides the planar hinge plate into a first portion and a second portion and that defines a linear bend line about which the first portion will bend with respect to the second portion when subjected to a predetermined force from any direction such that when the second post member is impacted by an object from any direction and broken loose from the ground, the second post member will remain attached to the first post member and bend over about the bend line.

7. A connector for attaching a first post section to a second post section to form a unitary support post for road signs, lights, and guardrails, the first and second post sections each having a central web member that has at least two side walls extending therefrom to form at least one U-shaped channel, comprising:

a planar plate having a first plate section sized and shaped to be attached to the web member outside the U-shaped channel of the first post section, a second plate section sized and shaped to be attached to the web member outside the U-shaped channel of the second post section, and a channel formed entirely across at least one planar side of the plate to divide the first plate section from the second plate section, and further including at least one V-shaped cutout section that communicates with the first plate section and the second plate section and the channel to further direct force from any direction on the first and second plate sections to the channel, the at least one cutout section formed completely through the respective first plate section and second plate section to converge in the channel to provide a linear weakened portion of the plate to facilitate bending and tearing of the plate at the linear weakened portion when the unitary post is subjected to a force from any direction.

8. The connector of claim 7 wherein the at least one cutout section comprises a first cutout section formed in a first edge of the plate that communicates with the channel and a second cutout section formed in an opposing edge of the plate that communicates with an opposing portion of the channel.

9. The connector of claim 8 wherein the V-shaped cutout section is in the shape of a V that has a first portion removed from the first plate section and a second portion removed from the second plate section and a point terminating in the channel and the width of the cutout section increases towards the respective edge of the first and second plate sections in the plate.

10. The connector of claim 9, further comprising an opening formed in the channel and through the plate for further directing force to the channel.

11. The system of claim 6 wherein the groove in the reduced thickness portion comprises a channel formed in at least one side of the hinge plate.

12. The system of claim 11 wherein the channel has a V-shaped cross-sectional configuration.

* * * * *